United States Patent
Hester et al.

(10) Patent No.: US 9,459,083 B2
(45) Date of Patent: Oct. 4, 2016

(54) POSITIONING GONIOMETRY

(71) Applicant: SEAGATE TECHNOLOGY LLC, Cupertino, CA (US)

(72) Inventors: Grant Hester, Longmont, CO (US); Phil Gooras, Frederick, CO (US)

(73) Assignee: SEAGATE TECHNOLOGY, LLC, Cupertino, CA (US)

( * ) Notice: Subject to any disclaimer, the term of this patent is extended or adjusted under 35 U.S.C. 154(b) by 99 days.

(21) Appl. No.: 14/591,713

(22) Filed: Jan. 7, 2015

(65) Prior Publication Data
US 2016/0195381 A1 Jul. 7, 2016

(51) Int. Cl.
*B23Q 1/25* (2006.01)
*G01B 5/00* (2006.01)
*G01B 5/24* (2006.01)

(52) U.S. Cl.
CPC .............. *G01B 5/0004* (2013.01); *G01B 5/24* (2013.01)

(58) Field of Classification Search
CPC ............................. G01B 5/0004; G01B 5/24
USPC .................................. 33/1 N, 1 PT, 529, 569
See application file for complete search history.

(56) References Cited

U.S. PATENT DOCUMENTS

| | | | | |
|---|---|---|---|---|
| 4,515,415 A * | 5/1985 | Szenger | ................. | F16C 29/02 384/44 |
| 4,647,767 A * | 3/1987 | Jubinski | .................. | G01C 9/06 250/227.25 |
| 4,934,671 A * | 6/1990 | Laninga | ............... | B23Q 1/5443 269/20 |
| 6,442,851 B1 * | 9/2002 | Botos | ................... | G02B 6/2555 33/1 M |
| 6,705,019 B2 * | 3/2004 | Mauro | ..................... | B23Q 1/50 269/60 |
| 7,891,111 B2 | 2/2011 | Mauro | | |
| 2002/0108259 A1* | 8/2002 | Feichtinger | .......... | G01D 5/3473 33/1 PT |
| 2002/0148131 A1* | 10/2002 | Mauro | ..................... | B23Q 1/50 33/569 |
| 2007/0009323 A1* | 1/2007 | Jones | ................. | G01D 5/34738 403/345 |
| 2012/0079733 A1* | 4/2012 | Smirman | ............. | A61B 5/1121 33/534 |
| 2014/0109646 A1* | 4/2014 | Manlay | .................... | G01B 5/24 73/1.75 |
| 2015/0345693 A1* | 12/2015 | Yang | .................... | G01B 5/0004 108/21 |

* cited by examiner

*Primary Examiner* — G. Bradley Bennett
(74) *Attorney, Agent, or Firm* — Hall Estill Attorneys At Law

(57) ABSTRACT

An apparatus and associated method contemplating a goniometer stage having a base, and a roller bearing having a first annular race supported by the base and a concentric second annular race. A rotor plate is configured to support a workpiece, and defines a bearing surface contacting the second annular race throughout a selective movement of the rotor plate with respect to the base along an arc defining an axis of rotation that is spaced apart from the rotor plate.

20 Claims, 6 Drawing Sheets

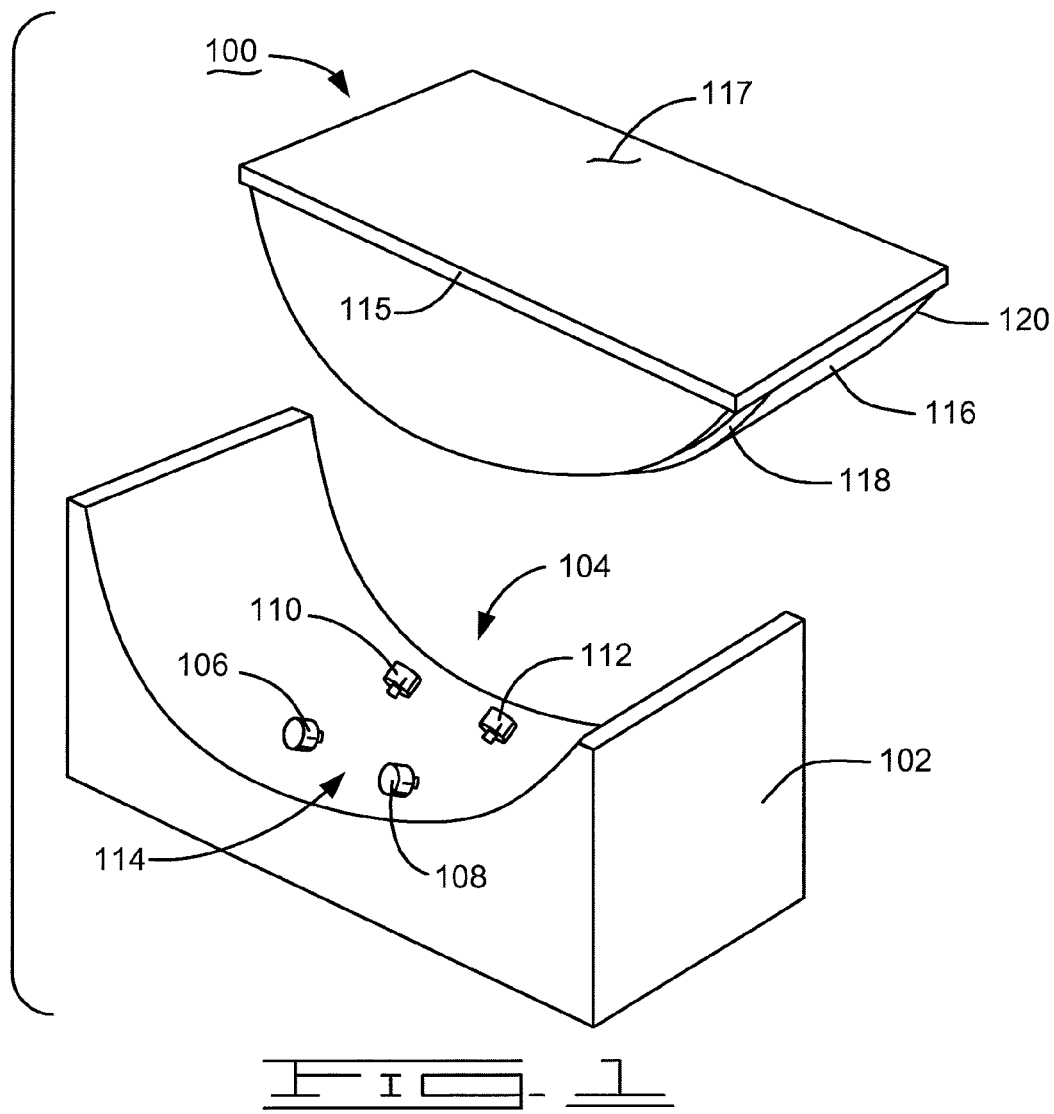
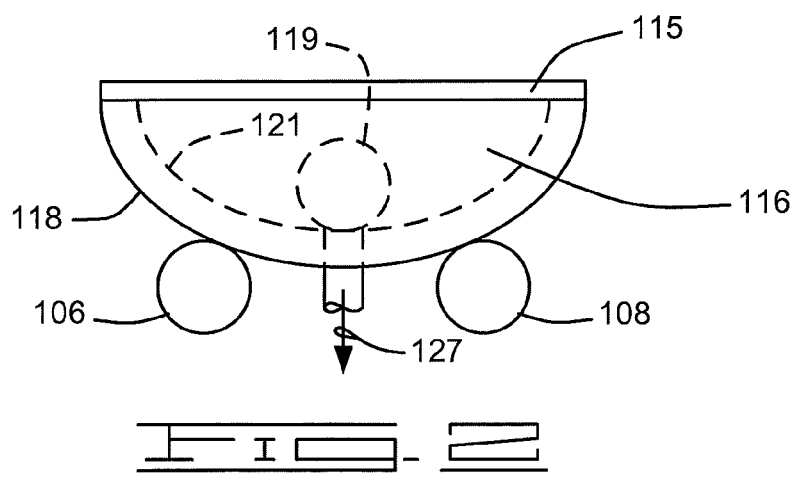

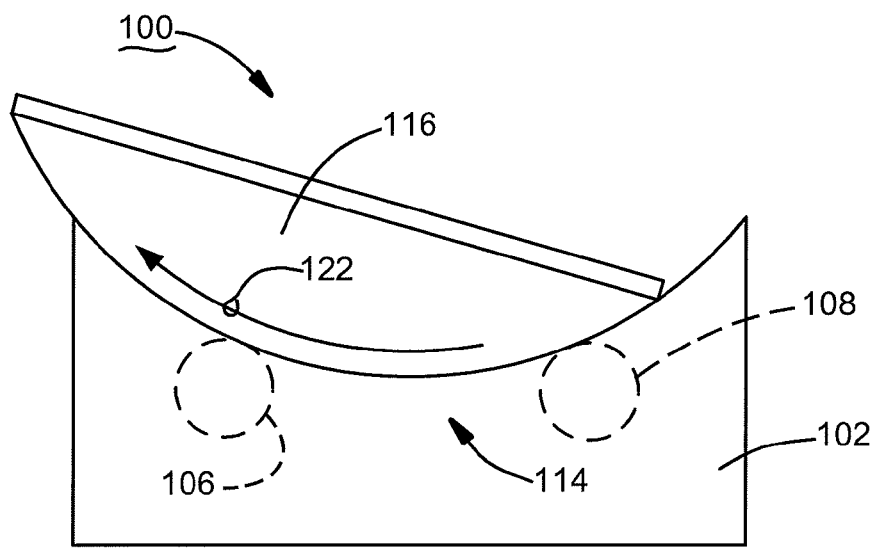
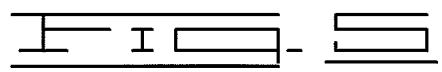
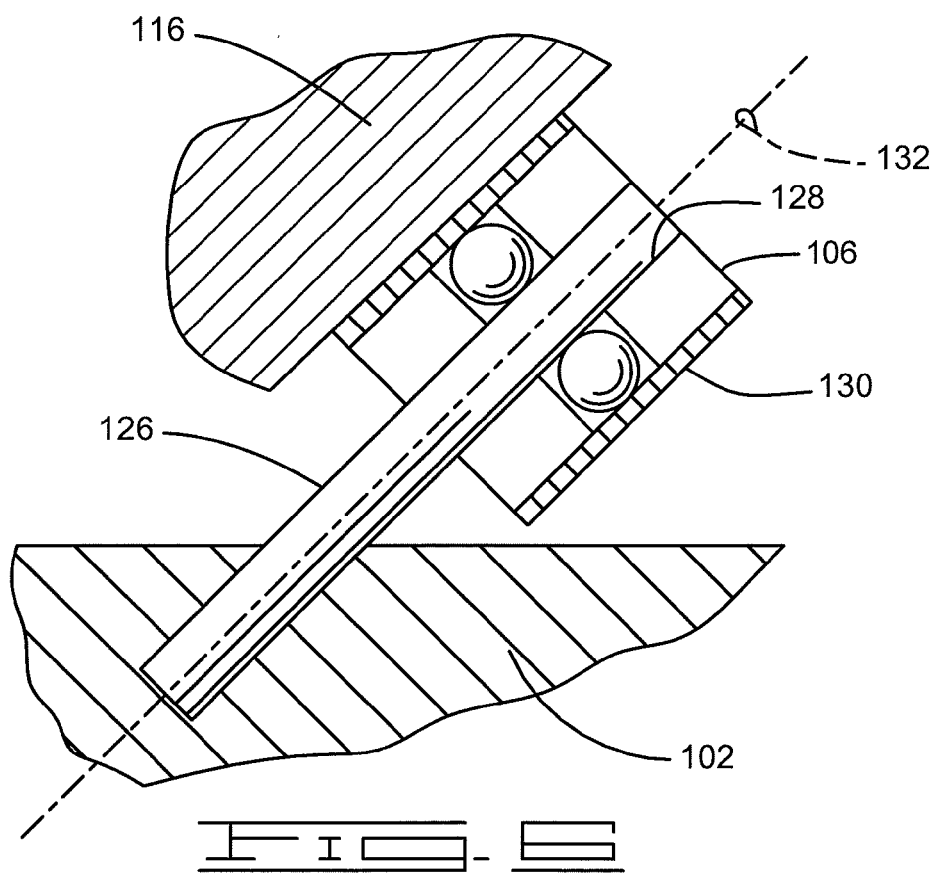
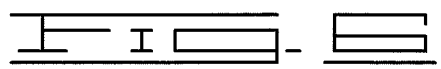

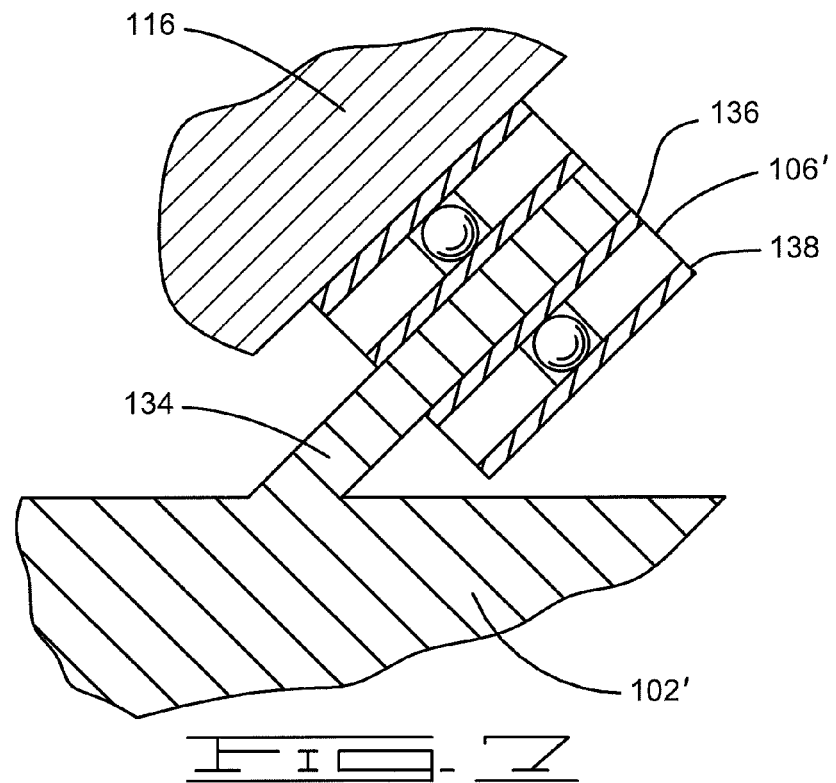
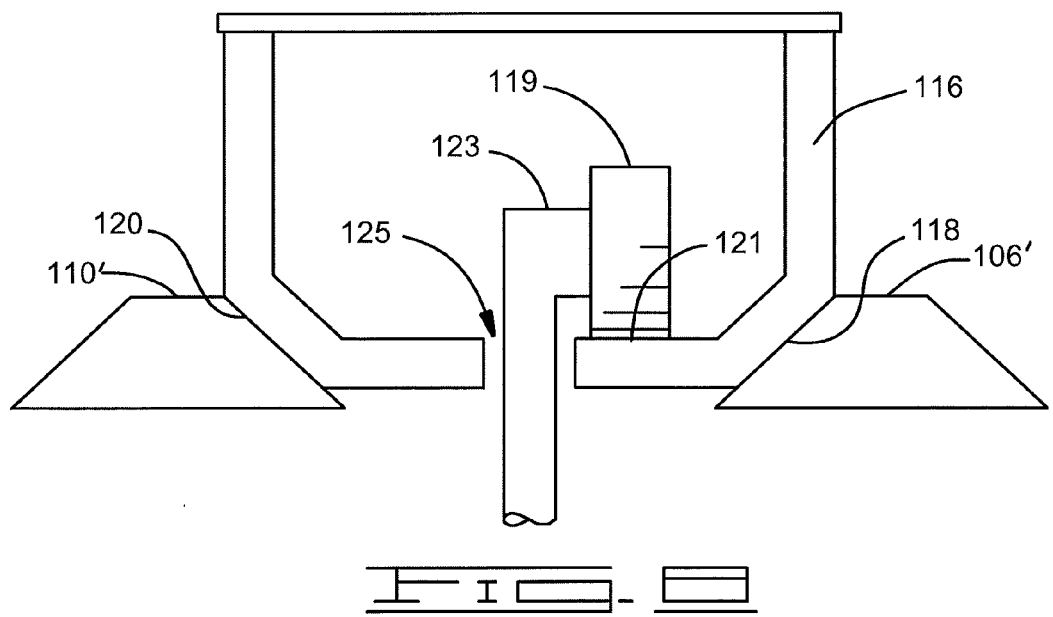

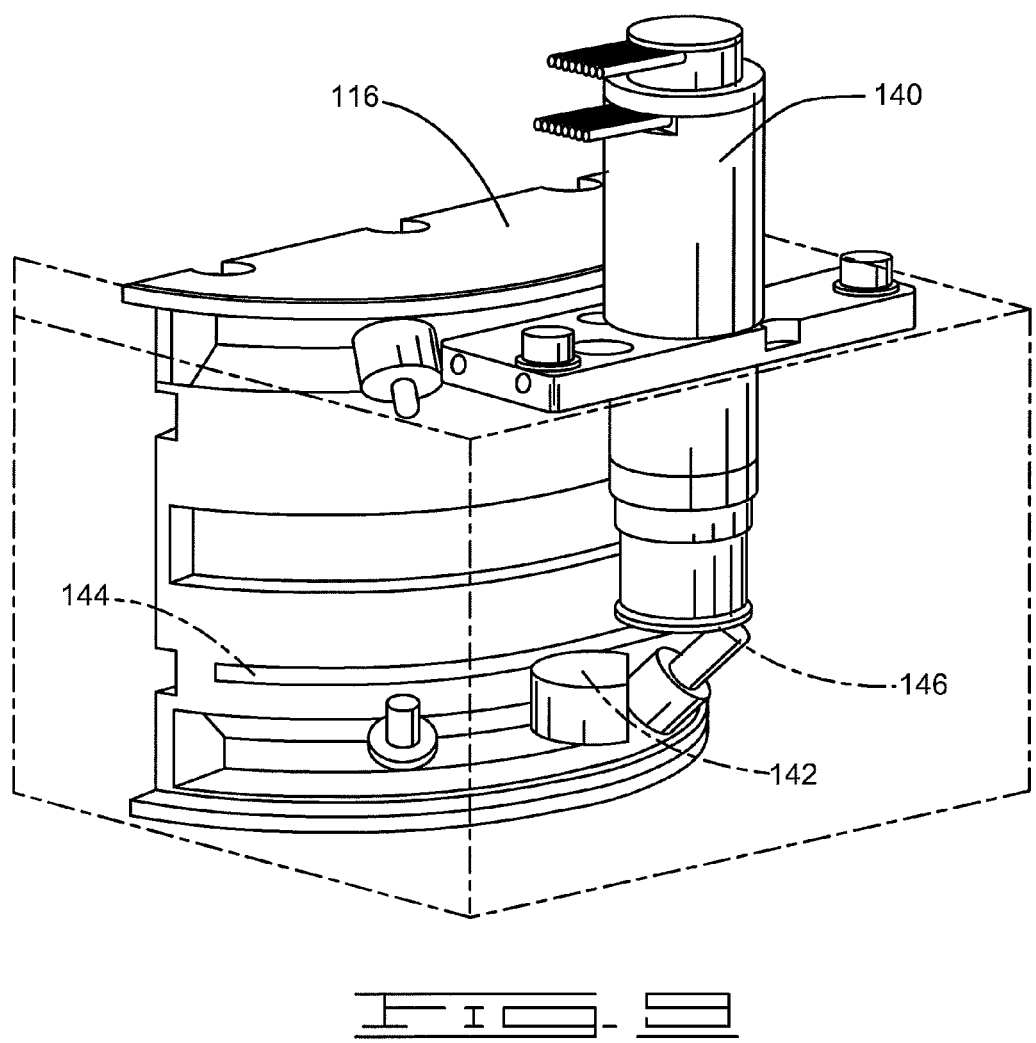

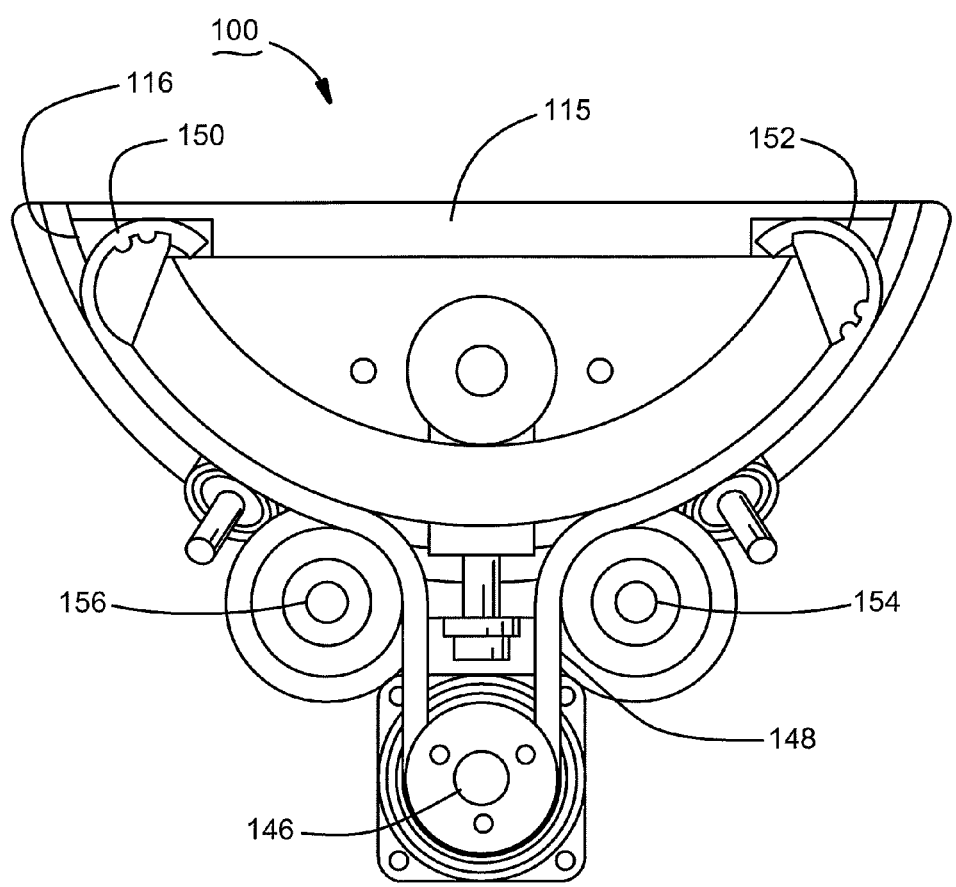
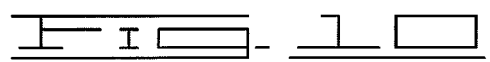

US 9,459,083 B2

POSITIONING GONIOMETRY

SUMMARY

Various embodiments of the present technology are generally directed to the construction and use of broad range goniometry.

Some embodiments of this disclosure contemplate a goniometer stage having a base, and a roller bearing having a first annular race supported by the base and a concentric second annular race. A rotor plate is configured to support a workpiece, and defines a bearing surface contacting the second annular race throughout a selective movement of the rotor plate with respect to the base along an arc defining an axis of rotation that is spaced apart from the rotor plate.

Some embodiments of this disclosure contemplate a positioning apparatus having a base supporting a plurality of discrete roller bearings arranged to collectively form a bearing cradle. A rotor plate is configured to support a workpiece, and is supported by the bearing cradle during selective movement with respect to the base along an arc having an axis of rotation that is spaced apart from the rotor plate. A drive assembly is configured to selectively position the rotor plate at a nominal position and alternatively to rotate the rotor plate more than twenty degrees around the axis of rotation in each of opposing rotational directions from the nominal position.

Some embodiments of this disclosure contemplate a method that includes: obtaining a goniometer stage having a moveable rotor plate that is rotatably supported upon a bearing cradle in a stationary base, the rotor plate configured to support and rotate a workpiece around an offset axis of rotation that is separate from boundaries of the goniometer stage; and selectively rotating the workpiece around the offset axis at least twenty degrees in each of opposing rotational directions from a nominal position.

BRIEF DESCRIPTION OF THE DRAWINGS

FIG. 1 is a partially exploded isometric depiction of a goniometer stage that is constructed in accordance with illustrative embodiments of this technology.

FIG. 2 diagrammatically depicts a side of the rotor plate supported upon the bearing cradle.

FIG. 5 is similar to FIG. 4 but depicting the rotor plate rotated clockwise more than thirty degrees.

FIG. 6 is an enlarged detail view of a spindle bearing forming a portion of the bearing cradle.

FIG. 7 is an enlarged detail view of an alternative construction of a bearing forming a portion of the bearing cradle.

FIG. 8 is similar to FIG. 3 but depicting tapered roller bearings in an alternative construction of this technology.

FIG. 9 is an isometric depiction of the goniometer of FIG. 1 with a servo motor and position encoder for selectively moving the rotor plate.

FIG. 10 is an elevational depiction of the flexible belt coupling the servo motor to the rotor plate.

DETAILED DESCRIPTION

Figure 3:
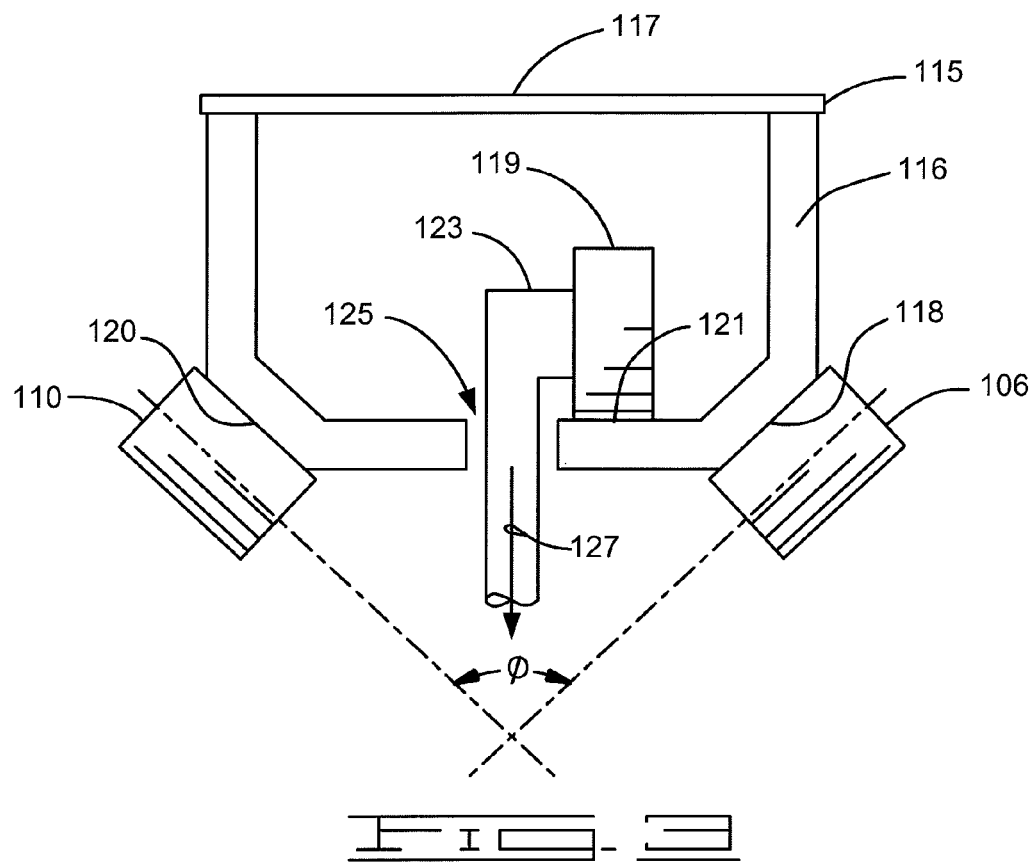
FIG. 3 diagrammatically depicts an end of the rotor plate supported upon the bearing cradle.

The present disclosure generally relates to the design and use of positioning goniometer technology. A positioning goniometer, referred to herein as a goniometer stage, is used to selectively position a workpiece for precise measurements. That is, a goniometer stage can be used to precisely position an article being measured, or a goniometer stage can be used to precisely position a measurement device for measuring an article. For purposes of this description and meaning of the appended claims, the term "workpiece" can mean either an article being measured or a measurement device. The workpiece is secured to a rotor platform portion of the goniometer stage that is selectively movable, so that the workpiece and the rotor platform move in unison. A goniometer stage is similar to a linear positioner except that the movement of the rotor plate relative to a stationary base is arcuate instead of linear. That is, the rotor platform is moveable along an arc having a relatively large axis of rotation. The axis of rotation is actually located beyond the physical boundary of the goniometer stage itself.

Previously attempted solutions are typically constructed with an integrated cross roller bearing supporting the rotor platform in its movement relative to the stationary base. The cross roller bearing has a number of rolling elements, such as ball bearings, trapped in a cage that is curved to closely mate between the concave base and the convex rotor platform. An inherent limitation of that design is that rotation away from a nominal (zero degrees) position reduces the surface area of bearing support. That means most previously attempted solutions can only provide up to about ten degrees of rotation in a given direction. There is a need for a positioning goniometer that retains the advantage of a large open field of view above the rotor platform yet can significantly increase the range of rotor platform rotation. It is to that solution that the embodiments of this technology are directed.

FIG. 1 is a partially exploded isometric depiction of a goniometer stage 100 that is constructed in accordance with illustrative embodiments of the present technology. The goniometer stage 100 generally has a base 102 defining a concave opening 104 in which a plurality of (in these illustrative embodiments four) bearings 106, 108, 110, 112 are arranged to collectively form a bearing cradle 114. A rotor platform 116 defines a pair of convex, arcuate bearing surfaces 118, 120 that roll against the bearings 106, 108, 110, 112 in operably supporting the rotor platform 116 at various selected rotational positions.

The rotor platform 116 has a top plate 115 defining an exposed surface 117 that is configured to support the workpiece (not depicted) for selective positioning. To that end, although not depicted it is understood that the surface 117 can be provided with attachment features such as threaded apertures, T-shaped slots, and the like for affixing the workpiece to the rotor platform 116.

As shown in the elevational depiction of FIG. 2, the arcuate bearing surface 118 simultaneously contacts both bearings 106, 108 throughout the selective movement of the rotor platform 116, and likewise (although not depicted in FIG. 2) the bearing surface 120 simultaneously contacts both bearings 110, 112. The end depiction of FIG. 3 shows opposing bearings 106, 110 are canted, forming a concave angular relationship Ø therebetween, in order to cradle the bearing surfaces 118, 120 against the bearings 106, 110. Although not depicted in FIG. 3, the other opposing bearings 108, 112 are likewise canted in these illustrative embodiments.

A roller 119 is positioned inside the rotor plate 116 and rolls in a frictional engagement against an internal surface 121 throughout the movement of the rotor plate 116. The roller 119 is supported by a shaft 123 sized to pass through a slot 125 provided in the rotor plate 116. The shaft 123 is biased in the direction of arrow 127 (downward as depicted) to urge the roller 119 against the surface 121 which, in turn, biases the bearing surfaces 118, 120 by a selected preload force against the bearings 106, 108, 110, 112. The force in direction 127 can be provided by a mechanical spring mechanism, or a mechanical actuator, and the like.

Figure 4:
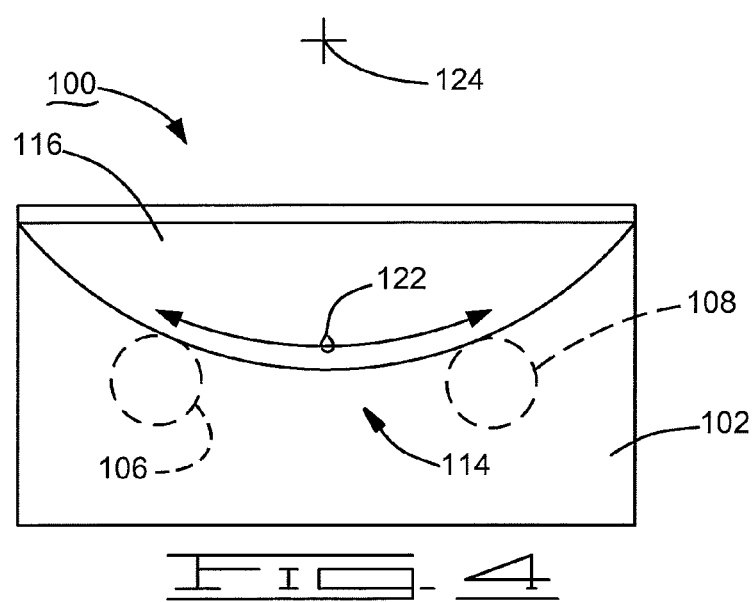
FIG. 4 is an elevational depiction of the goniometer stage of FIG. 1 with the rotor plate at zero degrees of rotation.

FIG. 4 is an elevational depiction of the rotor platform 116 as it is operably supported on the bearing cradle 114 in the base 102. The rotor platform 116 is depicted at a nominal, in this case horizontal, position referenced as a position of zero degrees of rotation. The rotor platform 116 is selectively moveable in both clockwise and counterclockwise rotational directions along an arc depicted by the arrow 122 that has an axis of rotation 124 spaced apart and separate from the boundaries of the goniometer stage 100. FIG. 5 is similar to FIG. 4 but depicting the rotor platform 116 having been rotated more than thirty degrees in the clockwise direction 122 for using the workpiece (not depicted) at that selected orientation. The rotor platform 116 is likewise selectively moveable to the mirror position in the counterclockwise rotational direction. Thus, the illustrative embodiments of this technology are capable of a total range of more than sixty degrees of rotation.

The illustrative embodiments so far have four bearings 106, 108, 110, 112 making up the bearing cradle 114, although the contemplated embodiments are not so limited. In alternative embodiments more or fewer bearings can be employed. In fact, the skilled artisan understands that the bearing surfaces 118, 120 and the bearing 106, 108, 110, 112 positioning are necessarily very precise (low tolerances) in order to make four-point rolling contact on the bearing cradle 114 described. Three point contact can also be employed by having two bearings support one of the bearing surfaces 118, 120 and only one bearing support the other bearing surface 118, 120. In that case the two bearings on the same bearing surface are spaced apart and the one bearing on the other bearing surface is positioned between them to form a triangular three-point bearing cradle.

FIG. 6 is an enlarged detail depiction of one of the bearings 106 in illustrative embodiments constructed as a spindle bearing. In these embodiments the bearing 106 has a stationary spindle 126 with a proximal end thereof that is attached to the base 102. A distal end of the spindle 126 forms an inner race 128 around which a concentric outer race 130 is journalled in rotation. The outer race 130 rotates around an axis 132 that remains fixed with respect to the base 102 in support of the rotor plate 116 throughout its selective movements. Note that this arrangement provides the same four-point bearing support of the bearing cradle 114 at the nominal position depicted in FIG. 4, at the extent of clockwise rotation depicted in FIG. 5, and at all rotational positions therebetween.

FIG. 7 depicts alternative embodiments similar to FIG. 6 but wherein a protuberant securement member 134 is either attached to or as depicted is formed as a portion of the base 102'. A roller bearing 106' has an inner race 136 attached to the securement member 134, around which a concentric outer race 138 is journalled in rotation to support the rotor plate 116 during the selective movements.

FIG. 8 is similar to FIG. 3 but depicting alternative embodiments in which tapered roller bearings 106', 110' are mounted parallel to each other rather than the canted arrangement previously described. The tapered bearings 106', 110' cradle the bearing surfaces 118, 120 in the same way as the canted bearings.

The goniometer stage 100 described so far is well suited for manually positioning the rotor plate 116 at a selected rotational position. A latch or a frictional crowder and the like can be employed to retain the rotor plate 116 at the selected position. FIG. 9 is an isometric depiction of alternative embodiments that employ a servo motor 140 with a positional encoder 142 for processor-controlled movement of the rotor plate 116 and retaining it at a selected position. The encoder 142 is positioned to read indicia 144, such as optical or magnetic data, that is affixed to the arcuate surface of the rotor plate 116.

The servo motor 140 drives a pulley 146 according to a control system that responds to a call to move the rotor plate 116 to a selected position, with actual position feedback data provided by the encoder 142. FIG. 10 depicts a flexible belt 148 has a medial portion that is trained around the pulley 146 so that rotation of the pulley 146 transfers corresponding forces to the belt 148. Both ends 150, 152 of the flexible belt 148 are clamped in place by an attachment of the top plate 115. A pair of idler rollers 154, 156 impart tension to the belt 148 to prevent slippage between it and the pulley 146. With this arrangement, programmed actuation of the servo motor 148 rotates the pulley 146 that, in turn, creates tension in the belt 148 to rotate the rotor platform 116 to a selected position. Positional feedback from the encoder 142 is utilized with predefined velocity profiles and positional error compensation to control the movement of the rotor platform 116. After the desired position is obtained, a dwell load on the servo motor 140 retains the rotor platform 116 at the desired position.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A goniometer stage comprising:
   a base;
   a roller bearing having a first annular race supported by the base and a concentric second annular race; and
   a rotor plate configured to support a workpiece and defining a bearing surface contacting the second annular race throughout a selective movement of the rotor plate with respect to the base along an arc defining an axis of rotation that is spaced apart from the rotor plate.

2. The goniometer stage of claim 1 wherein the second annular race rotates around an axis that is fixed with respect to the base.

3. The goniometer stage of claim 1 wherein the roller bearing is a first roller bearing, the apparatus comprising a second roller bearing supported by the base, the bearing surface simultaneously contacting both roller bearings during the selective movement of the rotor plate.

4. The goniometer stage of claim 3 wherein the bearing surface is a first bearing surface, the apparatus comprising a second bearing surface contacting a third roller bearing supported by the base simultaneously as the first bearing surface contacts the first and second roller bearings during the selective movement of the rotor plate.

5. The goniometer stage of claim 4 comprising a fourth roller bearing supported by the base, the second bearing surface simultaneously contacting the third and fourth roller bearings during the selective movement of the rotor plate.

6. The goniometer stage of claim 5 wherein the first and third roller bearings are opposingly disposed at a concave angular relationship to each other.

7. The goniometer stage of claim 5 wherein the roller bearings comprise spindle bearings, each having a fixed spindle attached to the base.

8. The goniometer stage of claim 5 wherein the base forms a securement member attached to the first annular race.

9. The goniometer stage of claim 5 wherein the roller bearings comprise taper bearings.

10. The goniometer stage of claim 5 comprising a bias member operably urging the bearing surfaces against the respective roller bearings.

11. The goniometer stage of claim 10 wherein the bias member comprises a roller frictionally engaged against the rotor plate during the selective movement of the rotor plate.

12. The goniometer stage of claim 5 comprising a motor that operably moves the rotor plate.

13. The goniometer stage of claim 12 comprising a flexible belt coupling the motor to the rotor plate.

14. A positioning apparatus comprising:
a base supporting a plurality of discrete roller bearings arranged to collectively form a bearing cradle;
a rotor plate configured to support a workpiece and supported by the bearing cradle during selective movement with respect to the base along an arc having an axis of rotation that is spaced apart from the rotor plate; and
a drive assembly configured to selectively position the rotor plate at a nominal position and alternatively to rotate the rotor plate more than twenty degrees around the axis of rotation in each of opposing rotational directions from the nominal position.

15. The positioning apparatus of claim 14 wherein the drive assembly is configured to rotate the rotor plate more than thirty degrees in each of the opposing rotational directions.

16. The positioning apparatus of claim 14 wherein the drive assembly comprises a servo motor and a position encoder.

17. The positioning apparatus of claim 16 comprising a flexible belt trained around an output shaft of the encoder motor.

18. The positioning apparatus of claim 17 wherein the flexible belt is connected at both separate ends to the rotor plate.

19. The positioning apparatus of claim 14 wherein the rotor plate is operably urged against the bearing cradle by a spring bias member.

20. A method comprising:
obtaining a goniometer stage having a moveable rotor plate that is rotatably supported upon a bearing cradle in a stationary base, the rotor plate configured to support and rotate a workpiece around an offset axis of rotation that is separate from boundaries of the goniometer stage; and
selectively rotating the workpiece around the offset axis at least twenty degrees in each of opposing rotational directions from a nominal position.

* * * * *